(12) United States Patent
Waldman et al.

(10) Patent No.: US 12,553,731 B2
(45) Date of Patent: Feb. 17, 2026

(54) ARRIVAL PREDICTIONS BASED ON DESTINATION SPECIFIC MODEL

(71) Applicant: RAKUTEN GROUP, INC., Tokyo (JP)

(72) Inventors: Jaron Waldman, Palo Alto, CA (US);
Seejo Pylappan, Cupertino, CA (US);
Denis Laprise, Sunnyvale, CA (US);
Harry Chen, San Jose, CA (US)

(73) Assignee: RAKUTEN GROUP, INC., Tokyo (JP)

( * ) Notice: Subject to any disclaimer, the term of this patent is extended or adjusted under 35 U.S.C. 154(b) by 208 days.

(21) Appl. No.: 17/039,017

(22) Filed: Sep. 30, 2020

(65) Prior Publication Data

US 2021/0018326 A1    Jan. 21, 2021

Related U.S. Application Data

(63) Continuation of application No. 15/672,399, filed on Aug. 9, 2017, now Pat. No. 10,801,850.

(51) Int. Cl.
*G01C 21/00* (2006.01)
*G01C 21/34* (2006.01)
(Continued)

(52) U.S. Cl.
CPC ..... *G01C 21/3492* (2013.01); *G01C 21/3484* (2013.01); *G01C 21/3605* (2013.01);
(Continued)

(58) Field of Classification Search
CPC .............. G01C 21/349; G01C 21/3484; G01C 21/3605; G01C 21/3617; G01C 21/3626; G06N 20/00
See application file for complete search history.

(56) References Cited

U.S. PATENT DOCUMENTS

2002/0069017 A1  6/2002 Schmier et al.
2005/0021225 A1  1/2005 Kantarjiev et al.
(Continued)

FOREIGN PATENT DOCUMENTS

EP  1796058 A1  6/2007
EP  2341316 A1  7/2011
(Continued)

OTHER PUBLICATIONS

International Search Report and Written Opinion issued on Jan. 22, 2019 for corresponding PCT Application No. PCT/US2018/047080.
(Continued)

*Primary Examiner* — Adam M Alharbi
(74) *Attorney, Agent, or Firm* — Polsinelli PC

(57) ABSTRACT

The disclosed technology provides accurate arrival alerts to a destination. In some embodiments the disclosed technology utilizes a destination specific model that can take into account location specific factors such as traffic around the destination, best approaches to the destination, other likely intermediate stops on the way to the destination, etc. In some embodiments, the present technology aims to provide an arrival alert to the destination at a consistent time interval prior to a user arriving at the destination.

20 Claims, 9 Drawing Sheets

(51) Int. Cl.
  *G01C 21/36* (2006.01)
  *G06N 20/00* (2019.01)
  *G06F 3/01* (2006.01)

(52) U.S. Cl.
  CPC ..... *G01C 21/3617* (2013.01); *G01C 21/3626* (2013.01); *G06N 20/00* (2019.01); *G06F 3/017* (2013.01)

(56) References Cited

U.S. PATENT DOCUMENTS

| | | |
|---|---|---|
| 2005/0114014 A1 | 5/2005 | Isaac |
| 2006/0164259 A1 | 7/2006 | Winkler et al. |
| 2011/0130958 A1 | 6/2011 | Stahl et al. |
| 2011/0213551 A1 | 9/2011 | Shioda et al. |
| 2014/0200804 A1 | 7/2014 | Wippler |
| 2015/0032366 A1 | 1/2015 | Man et al. |
| 2016/0047667 A1 | 2/2016 | Kantarjiev et al. |
| 2016/0202074 A1 | 7/2016 | Woodard et al. |
| 2016/0216123 A1 | 7/2016 | Liao et al. |
| 2016/0247113 A1 | 8/2016 | Rademaker |
| 2017/0108348 A1* | 4/2017 | Hansen ............... H04W 4/024 |
| 2017/0193627 A1 | 7/2017 | Urmson et al. |
| 2018/0121994 A1* | 5/2018 | Matsunaga ........ G06Q 30/0635 |
| 2018/0285960 A1* | 10/2018 | Li ...................... G06Q 30/0635 |
| 2022/0003561 A1* | 1/2022 | Shoval ................. G01C 21/362 |

FOREIGN PATENT DOCUMENTS

| | | |
|---|---|---|
| JP | 2008139033 A | 6/2008 |
| WO | 2018129850 A1 | 7/2018 |

OTHER PUBLICATIONS

Partial European Search Report issued on Jun. 29, 2021 for corresponding European Application No. EP 18843799.

Supplementary European Search Report issued on Nov. 26, 2021 for corresponding European Application No. 18843799.

Japanese Office Action issued on Jun. 3, 2022, for corresponding JP Patent Application No. 2020-530454.

* cited by examiner

ARRIVAL PREDICTIONS BASED ON DESTINATION SPECIFIC MODEL

CROSS-REFERENCE TO RELATED APPLICATIONS

This application claims priority to and is a continuation of U.S. patent application Ser. No. 15/672,399, filed on Aug. 9, 2017, entitled "ARRIVAL PREDICTIONS BASED ON DESTINATION SPECIFIC MODEL," the entirety of which is herein incorporated by reference.

TECHNICAL FIELD

The present technology pertains to arrival alerts, and more specifically pertains to providing accurate alerts at a destination where a person or object of interest is traveling based on projecting the person or objects arrival at the destination using a destination to specific model.

BACKGROUND

Current services that provide arrival alerts often rely on a geo-fence around the destination. However such systems are wildly inaccurate because they depend on accurate location reporting from a user's mobile device. Unfortunately accurate location reporting from a mobile device is not sufficiently consistent to provide quality arrival alerts. Also, even when reporting from a mobile device is accurate, location specific factors can cause arrival times to vary. For example, a geo-fence set a quarter-mile around one destination might be sufficient to provide only one or two minutes notice of an arrival, while another geo-fence set a quarter-mile around another destination might result in a notice being sent ten minutes before arrival. Thus the effectiveness of the geo-fence technique is not sufficient. Additionally, current technologies that provide arrival alerts or arrival prediction times assume that a user will progress directly to the destination, which often may not be a correct assumption.

Such inadequacies of current arrival technologies, and arrival prediction technologies are widely experienced in apps pertaining to "sharing economy" services. For example ridesharing applications, or shared delivery service applications. Many users often experience predictions for when a driver might arrive at their location that significantly deviate from the actual arrival of those drivers.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art to provide accurate arrival alerts to a destination. In some embodiments the disclosed technology utilizes a destination specific model that can take into account location specific factors such as traffic around the destination, best approaches to the destination, other likely intermediate stops on the way to the destination, etc. In some embodiments, the present technology aims to provide an arrival alert to the destination at a consistent time interval prior to a user arriving at the destination rather than triggering alerts based solely on a distance from the destination (e.g., using a geo-fence).

Figure 1:
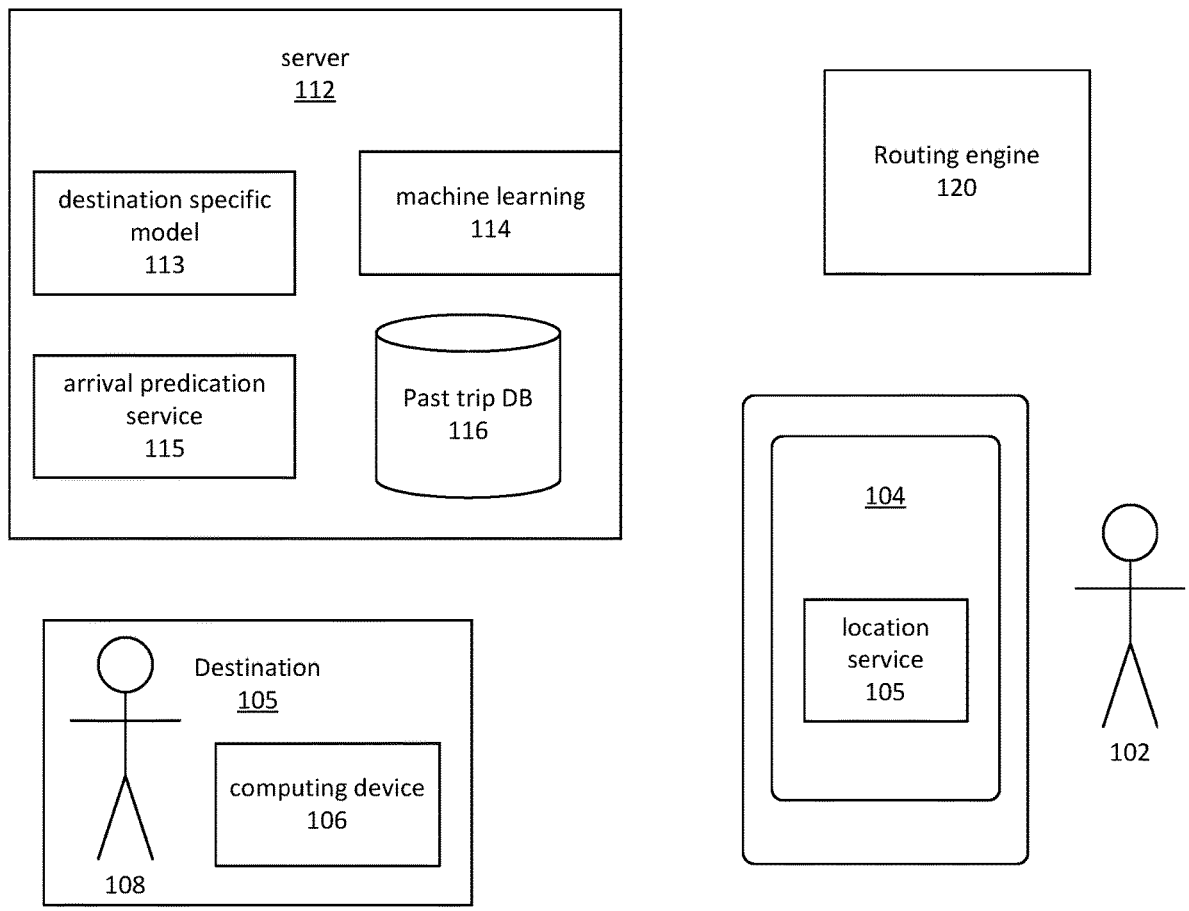
FIG. 1 shows an example system in accordance with some embodiments.
Figure 5:
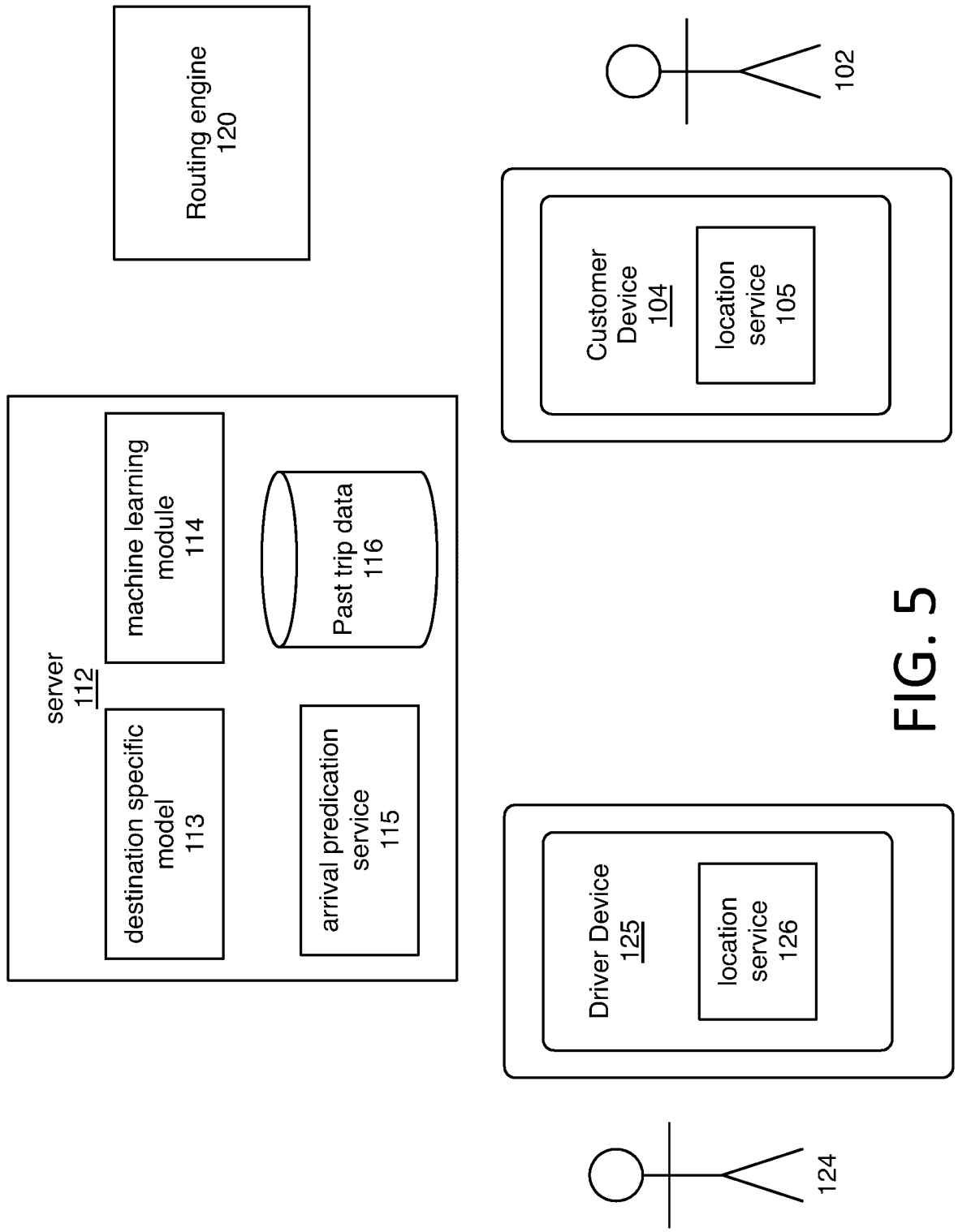
FIG. 5 shows an example system in accordance with some embodiments.

In some embodiments, as illustrated in FIG. 1, the disclosed technology pertains to an environment in which customer 102 has indicated that they will travel to destination 105. In some embodiments, destination 105 is a merchant having a brick-and-mortar location. However, as illustrated in FIG. 5, the present technology also pertains to an environment in which customer 102 has requested that service provider (e.g., a driver) 124 come to them. While throughout this description reference may be made to the environment illustrated in FIG. 1 or the environment illustrated in FIG. 5, persons of ordinary skill in the art should appreciate that the present technology applies equally to both environments unless otherwise indicated.

FIG. 1 illustrates an example environment wherein customer 102 has indicated that they will travel to destination 105. For example customer 102 may have placed an order with a merchant (being destination 105) that offers an advanced order and pick up service. In some embodiments, to provide the best customer experience, the merchant may receive notifications regarding customer's 102 projected arrival time to the destination 105 or notifications indicating that customer 102 has arrived at destination 105 so that the merchant can have the customer's 102 order complete when customer 102 arrives. Server 112 can provide these notifications.

Customer 102 can have an account with the merchant or an account with an intermediary service, and the account can be associated with customer's 102 mobile device 104 which can provide location service 105. Location service 105 can be configured to communicate location information to server 112.

Destination 105 is associated with computing device 106. Destination computing device 106 is configured to receive notifications from server 112 regarding customer arrival projections and customer arrival notifications.

Figure 2:
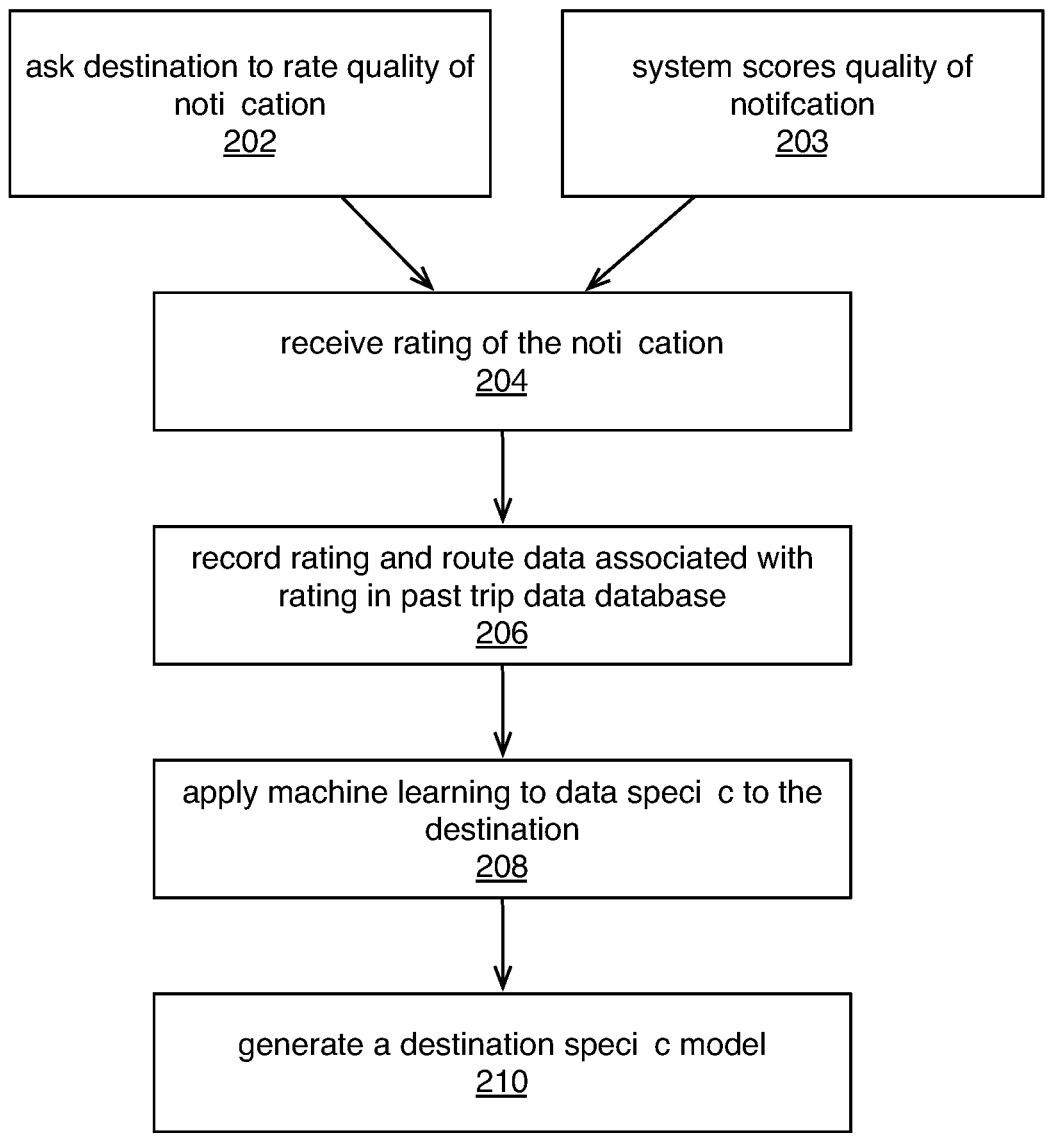
FIG. 2 shows an example method for creating a destination specific model in accordance with some embodiments.
Figure 3:
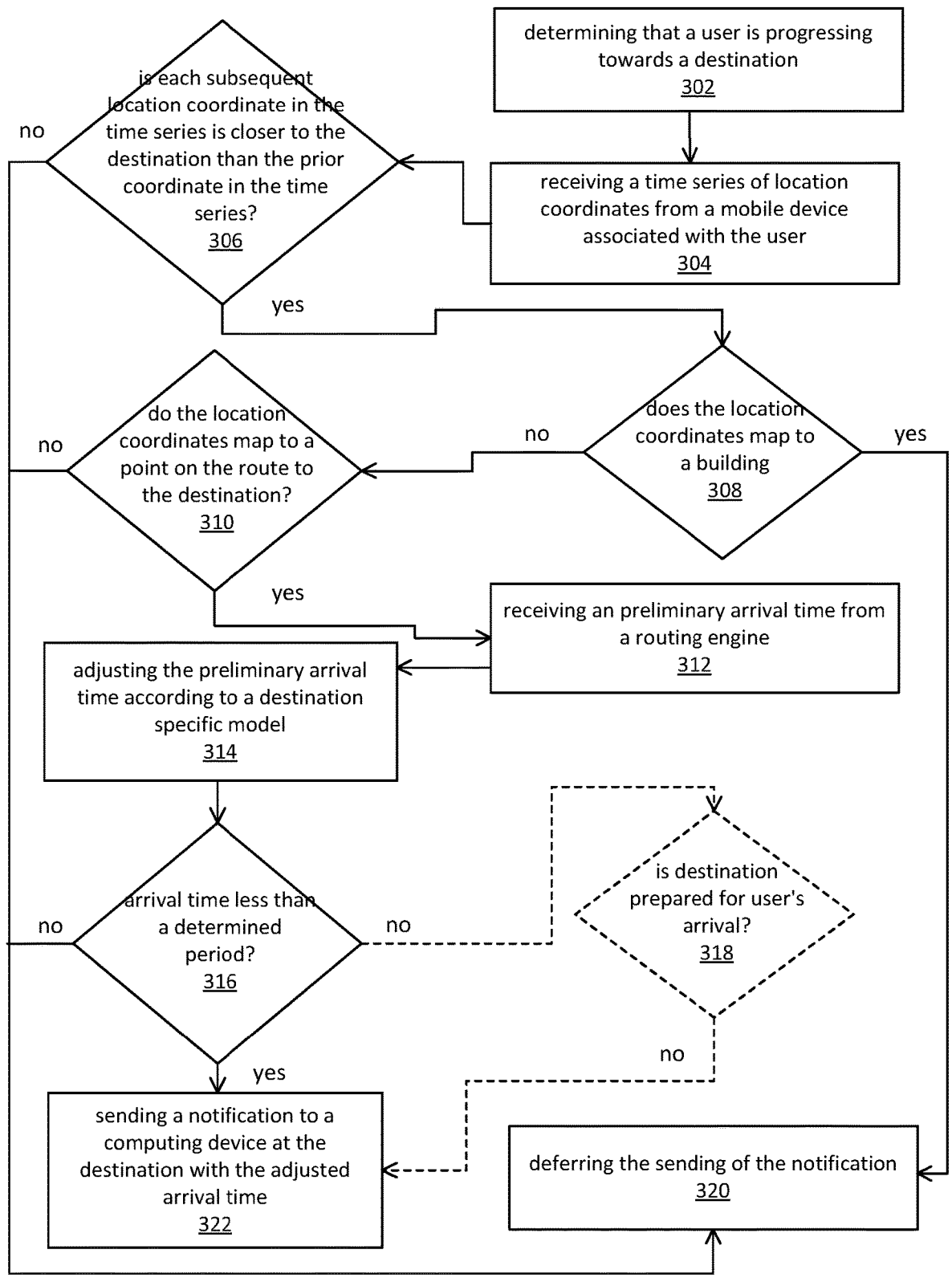
FIG. 3 shows an example method for determining when to send an arrival prediction in accordance with some embodiments.

FIG. 2 and FIG. 3 illustrate example method embodiments in accordance with some aspects of the present technology. While FIG. 2 and FIG. 3 will be discussed with reference to FIG. 1 the method illustrated in FIG. 2 and in FIG. 3 should not be considered limited to the operating environment illustrated in FIG. 1.

The present technology utilizes a destination specific model 113 when providing arrival predictions or arrival alerts. Destination specific model 113 is derived from machine learning 114 performed on a collection of past trip data stored in past trip database 116.

FIG. 2 illustrates an example method embodiment for generating a destination specific model. The method illustrated in FIG. 2 begins after one or more notifications have been provided to destination computing device 106 regarding an arrival prediction. Server 112 can store a collection of data in past trip database 116 regarding the quality of past notifications, an identifier of the past notifications, route data describing routes taken by users traveling to the destination, and a time of day associated with the respective notification.

Past trip database 116 can be populated when server 112 queries (202) destination computing device 106 to rate a quality of a notification pertaining to a specific customer's arrival. Merchant representative 108 operating destination computing device 106 can respond to the query, and server 112 can receive (204) the rating of the notification. Server 112 can record (206) the received notification in past trip database 116 in association with an ID of the notification. Past trip database 116 can store information regarding a route taken by the user in connection in the with notification, and any other data pertinent to the trip that resulted in the notification.

Past trip database 116 can aggregate the above data for trips by many users.

In some embodiments, either as an alternative to query 202 or in addition to query 202, server 112 can score (203) the quality of a notification pertaining to a specific customer's arrival based on how accurate server 112 perceives the information in the notification to have been. In some embodiments, this may be achieved by comparing the information included in the notification with observed data. For example, arrival prediction service 115 can send a notification to computing device 106 that user 102 will arrive in three minutes. Subsequently server 112 can observe that destination computing device 106 has notified server 112 that user 102 has arrived (e.g. user 102 has interacted with the merchant to pick up the ordered merchandise). Server 112 can compare the arrival prediction of three minutes provided in the notification with the observed amount of time between issuing the notification of user's 102 predicted arrival to computing device 106 and receiving the notification from computing device 106 that user 102 has arrived and can score (203) the notification of user's 102 predicted arrival based on its accuracy.

In addition to recording the rating or scoring of the quality of the notification in past trip database 116, server 112 can also record information regarding the route taken by user 102 on their way to destination 105. The route taken by user 102 can be learned from data reported by location service 105 to server 112 while user 102 and associated computing device 104 were traveling to destination 105. In some embodiments, from this route information, server 112 can determine if the user 102 made any stops while in route to destination 105. Server 112 can also record a time of day, day of week, and date associated with the notification in past trip database 116.

Machine learning 114 can be applied (208) to the historical data specific to destination 105 in past trip database 116 to generate (210) destination specific model 113. Destination specific model 113 is created or trained by analyzing factors associated with notifications that were considered of good quality and factors associated with notifications that were considered of poor quality. Since the destination specific model is generated through machine learning some dimensions of the of destination specific model 113 may not have any semantic meaning while some dimensions may have a semantic significance. For example, those dimensions having a semantic meaning can include a likelihood that a user will make other stops along the route, likelihood that a user will encounter traffic along the route, the most likely routes to the destination, etc.

In some embodiments machine learning 114 may initially be trained on all data in past trip database 116 regardless of destination to result in a location non-specific model. In such embodiments destination specific model 113 may be the result of tuning the location non-specific model for factors relevant to the specific destination.

FIG. 3 illustrates an example method for sending a notification with a predicted arrival time using destination specific model 113. The method illustrated in FIG. 3 begins by arrival prediction service 115 determining (302) that user 102 is progressing towards destination 105. The determining 302 involves receiving (304) a series of location coordinates over a period of time (i.e., a time series of location coordinates) from location service 105, and arrival prediction service 115 determining (306) if each subsequent location coordinate in the time series is closer to the destination than the prior coordinate in the time series.

Figure 4A:
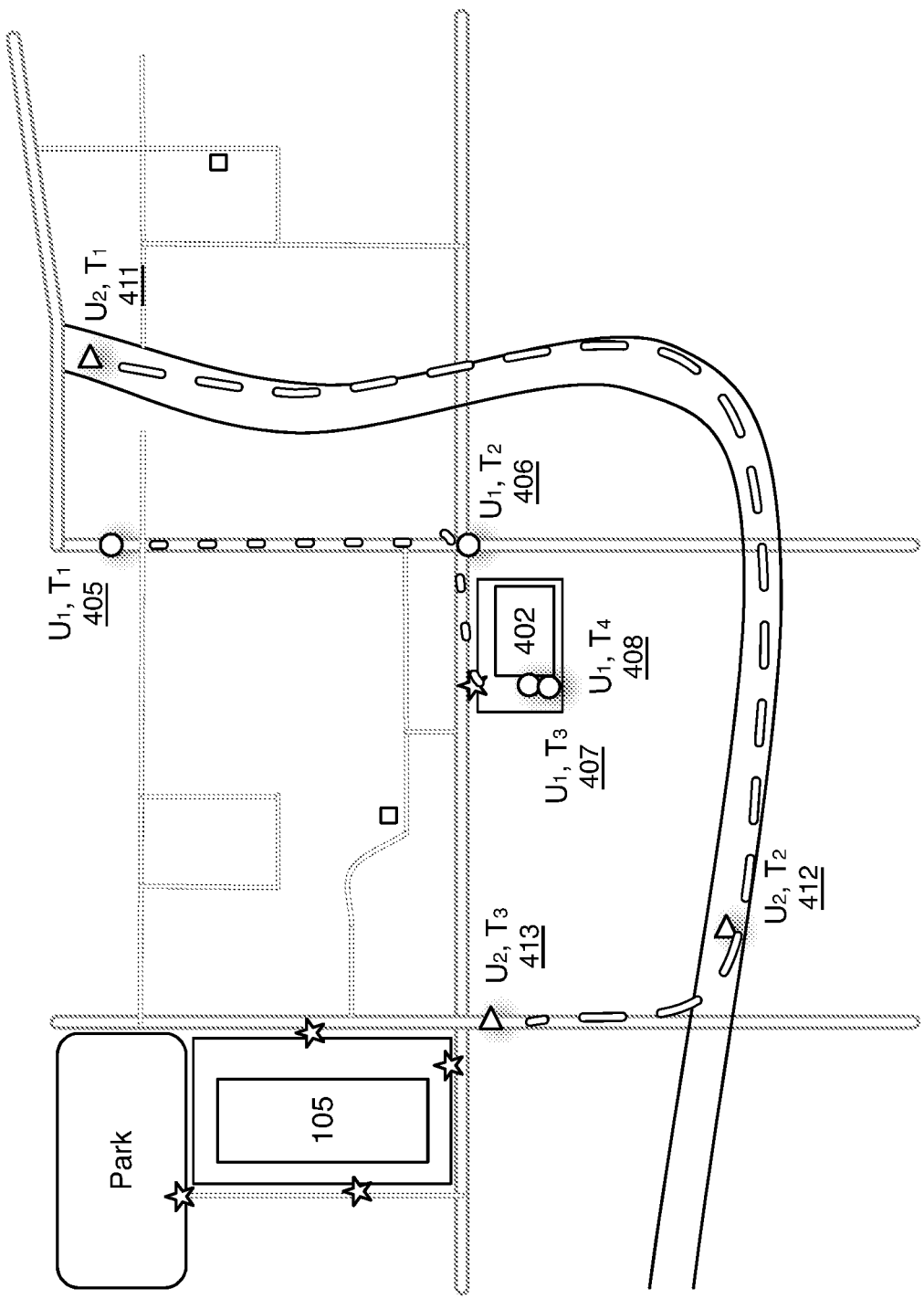
FIGS. 4A and 4B illustrate an example map in accordance with some embodiments.

For example FIG. 4A illustrates an example map wherein two users, U1 and U2 are in route to destination 105. User U1's route is shown by a time series of points at T1 405, T2 406, T3 407, and T4 408. As illustrated user U1 is progressing towards destination 105 until T3 407 wherein user U1 appears to stop at location 402. Point at T4 408 is also at the same location, so arrival prediction service 115 can conclude that user U1 has stopped at location 402. As such arrival prediction service 115 would determine (306) that each subsequent coordinate in the time series is not closer to the destination than the prior coordinate since the user U1's location at 407 and 408 are the same. In contrast user U2 progresses from point 411 at T1 to point 412 at T2 to point 413 at T3 where each point is closer to the destination than the last point, and as such arrival prediction service 115 can determine (306) that each subsequent coordinate in the time series is closer to the destination than the prior coordinate.

Since user U1 is not progressing to destination 105 arrival prediction service 115 can defer (320) the sending of the notification to destination computing device 106.

Since user U2 is progressing to destination 105 arrival prediction service 115 can determine (308) if the most recent location coordinate for a user maps to a building.

Figure 4B:
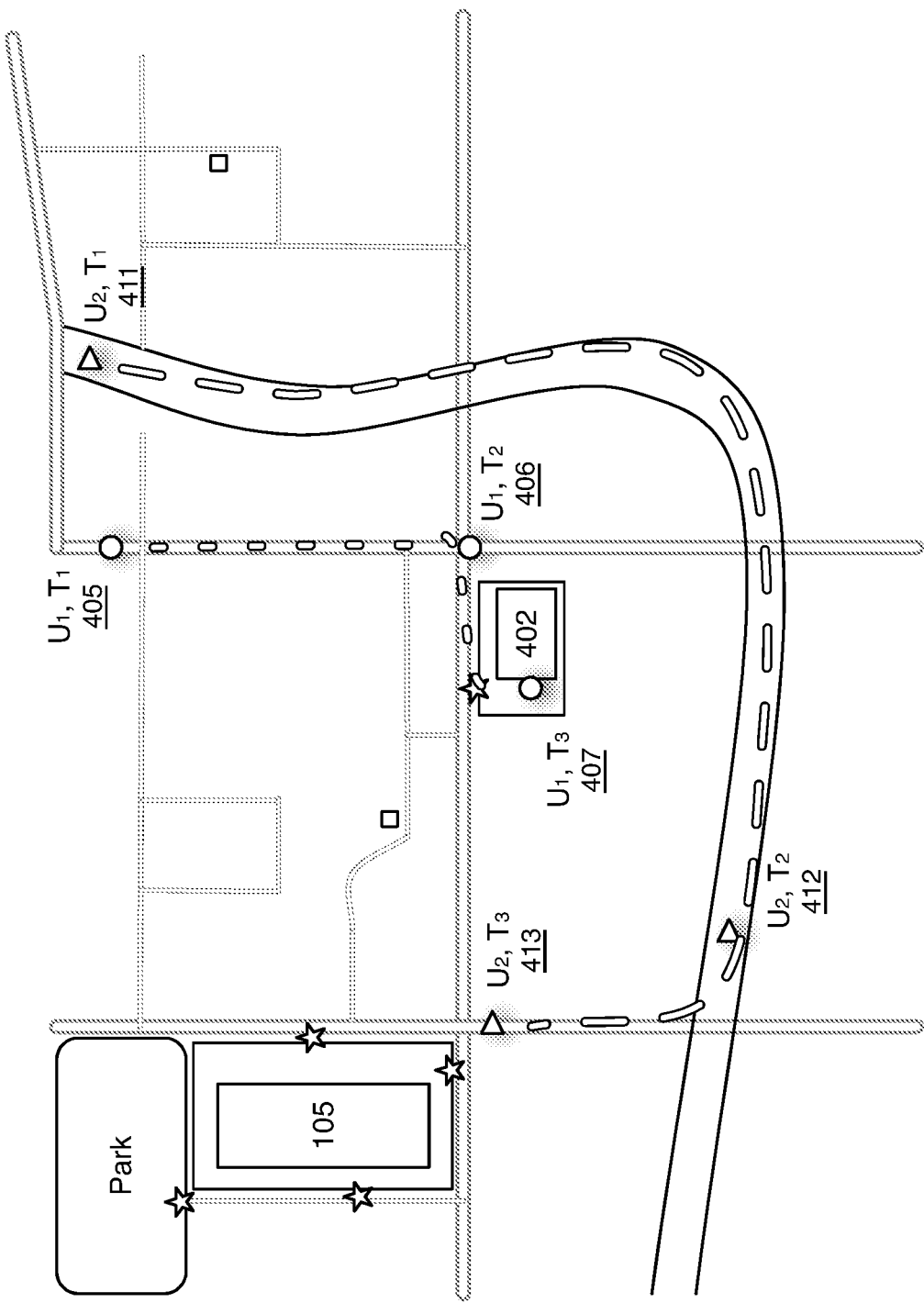

FIG. 4B again illustrates user U1 and user U2 on their way to destination 105, except that in FIG. 4B the time series of both users is progressing (302) to destination 105 since each of user U1's subsequent location coordinates are closer to the destination than the prior coordinates (306). Arrival prediction service 115 can determine (308) that user U1's last location coordinate maps to a building location 402, while user U2's last location coordinates are not mapped to a building. In response to determination 308 arrival prediction service can defer (320) sending the notification regarding user U1.

In some embodiments, when a user is determined (308) to be in a building, mobile device 104 can temporarily cease sending location information to server 112. In such embodiments, mobile device 104 can resume sending location updates to server 112 once mobile device 104 detects that it is moving away from the building.

Arrival prediction service 115 can next determine (310) whether the location coordinates of the user map to a point on a route to destination 105. Referring again to FIG. 4B user U2's last location coordinate does map to a point on the route to destination 105. In some embodiments, a route can include entry and exit driveways from a property.

When each location coordinate in the time series is closer to the destination (306), the last location coordinate does not map to a building (308), and the location coordinates map to a point on a route to the destination (308) arrival prediction service 115 can receive (312) a preliminary arrival prediction from routing engine 120.

Routing engine 120 can be any conventional routing engine such as commonly associated with mapping applications. Such routing engines take into account distance to a destination and speed limits and in some cases current traffic in providing the preliminary arrival time. However routing engine 120 does not account for other location specific factors such as most likely routes to the destination, likely stops along the way and any other learned factors in destination specific model 113.

Arrival prediction service 115 can receive (312) the preliminary arrival prediction from routing engine 120 and can adjust (314) the preliminary arrival time based on the destination specific model 113.

In some embodiments, arrival prediction service 115 can receive (312) the preliminary arrival prediction from routing engine 120 and utilize destination specific model 113 to determine a level of confidence in the preliminary arrival time. For example, if factors in destination specific model 113 suggest a low confidence that user 102 is heading directly to destination 105, the preliminary arrival prediction can be discarded, and it is not needed to adjust the arrival prediction. In some embodiments, a key aspect of accurate arrival prediction is predicting that user 102 is headed directly to destination 105.

When arrival prediction service 115 determines (316) that the adjusted arrival time is less than a predetermined time (e.g. less than three minutes) arrival prediction service 115 can send (322) a notification to destination computing device 106 with a prediction that user 102 will arrive at the adjusted arrival time.

In some embodiments, it can be beneficial to adjust the predetermined time for which notifications should be sent to destination computing device 106. For example, if server 112 has not received confirmation from destination computing device 106 that user's 102 order has been fulfilled, it may make sense to increase the predetermined threshold for when an arrival prediction notification should be sent. In such embodiments, the decision to send (322) the notification first involves the arrival prediction service determining (318) whether destination 105 is prepared for user's 102 arrival. In such embodiments arrival prediction service 115 can determine whether server 112 has received communication from destination computing device 106 indicating that user's 102 order is fulfilled and waiting to be picked up. If arrival prediction service 115 determines (318) that destination 105 has not yet fulfilled user's 102 order, arrival prediction service 115 can increase the predetermined time within which notifications should be sent to destination computing device 106. For example, if arrival prediction service 115 is configured to send arrival prediction notifications when user 102 is within three minutes of destination 105, arrival prediction service 115 can be configured to send arrival prediction notifications when user is within five minutes.

When arrival prediction service 115 determines (316) that the adjusted arrival time is greater than a predetermined time, arrival prediction service can defer (320) the sending of the notification.

FIG. 5 illustrates an example environment wherein customer 102 has requested a service performed by driver 124 wherein driver 124 will travel to a location designated by customer 102. In FIG. 5 customer's 102 role is reversed from that in FIG. 1 as in FIG. 5 customer 102 is receiving notices regarding driver's 124 arrival projection and arrival, whereas in FIG. 1 destination 105 was receiving notices regarding customer's 102 arrival projection and arrival.

While FIG. 6 and FIG. 7 will be discussed with reference to FIG. 5 the methods illustrated in FIG. 6 and FIG. 7 should not be considered limited to the operating environment illustrated in these figures. Additionally, the methods illustrated in FIG. 6 in FIG. 7 share similarities with the methods illustrated in FIG. 2 and FIG. 3, and as such the descriptions provided above with respect to FIG. 2 and FIG. 3 will apply to FIG. 6 and FIG. 7 unless otherwise indicated.

Figure 6:
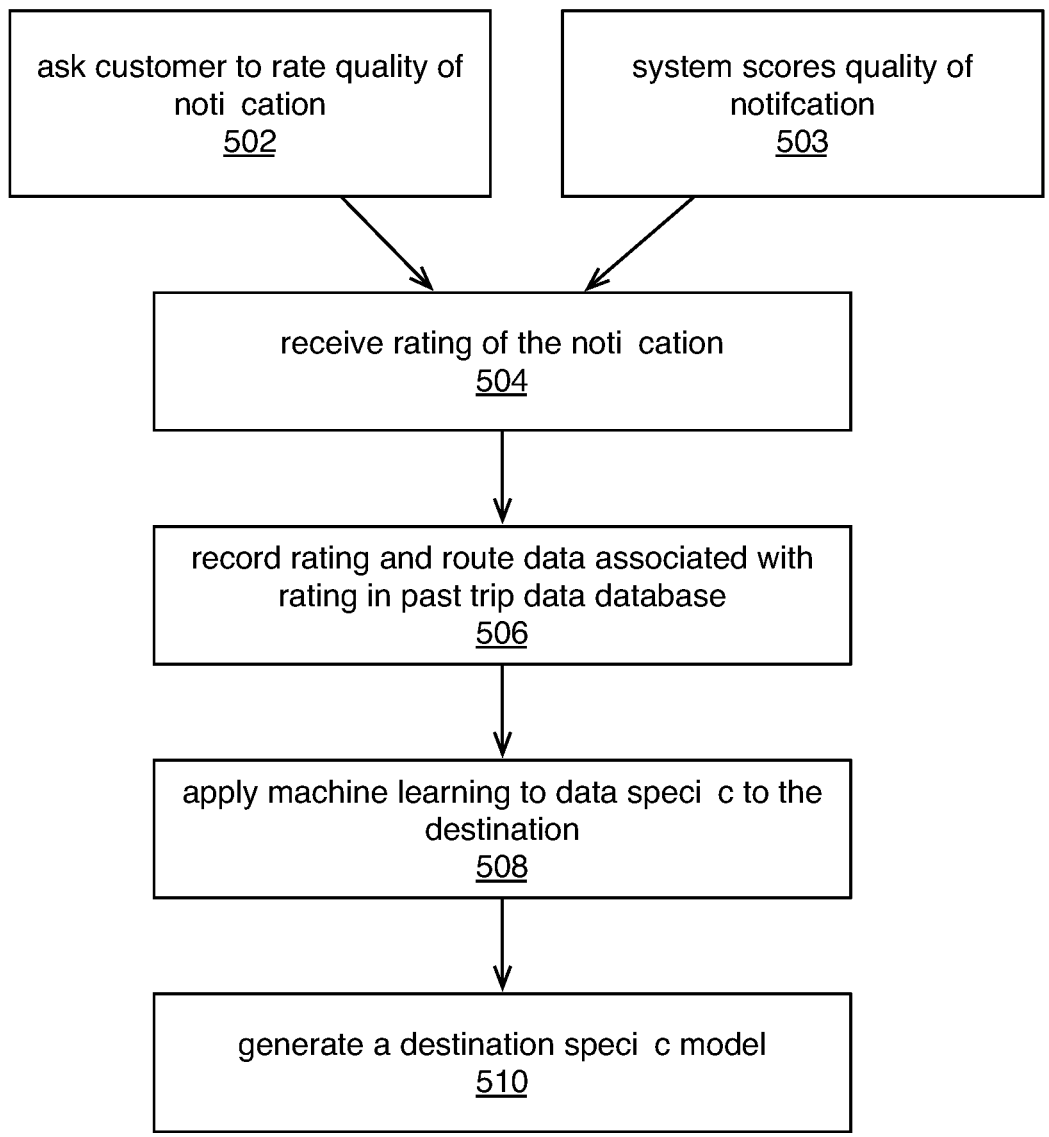
FIG. 6 shows an example method for creating a destination specific model in accordance with some embodiments.

FIG. 6 illustrates an example method for generating a destination specific model. However in FIG. 6 the destination is a customer that has requested a driver to travel to a location designated by customer 102. As will be appreciated by persons of ordinary skill in the art, a customer does not have a fixed location. A customer may make a request for a driver to travel to a first location for a first request and then later request a driver to travel to a second location for a second request. Therefore in the method illustrated in FIG. 6, server 112 can collect past trip data in past trip database 116 and machine learning 114 will analyze the data according to specific locations and not the requesting customer.

As illustrated in FIG. 6, server 112 can ask the customer 102 to rate (502) the quality of a past notification through customer device 104, and can receive (504) a rating from customer device 104. Server 112 can record (506) received data associated with the ranking in past trip database 116, and can apply machine learning 114 to data specific to a location in past trip database 116. This data may apply to data derived from many different requesting users that have requested a driver to travel to the same designated location. Based on the analysis of past trip data 116, machine learning 114 can generate a destination specific model 113.

Figure 7:
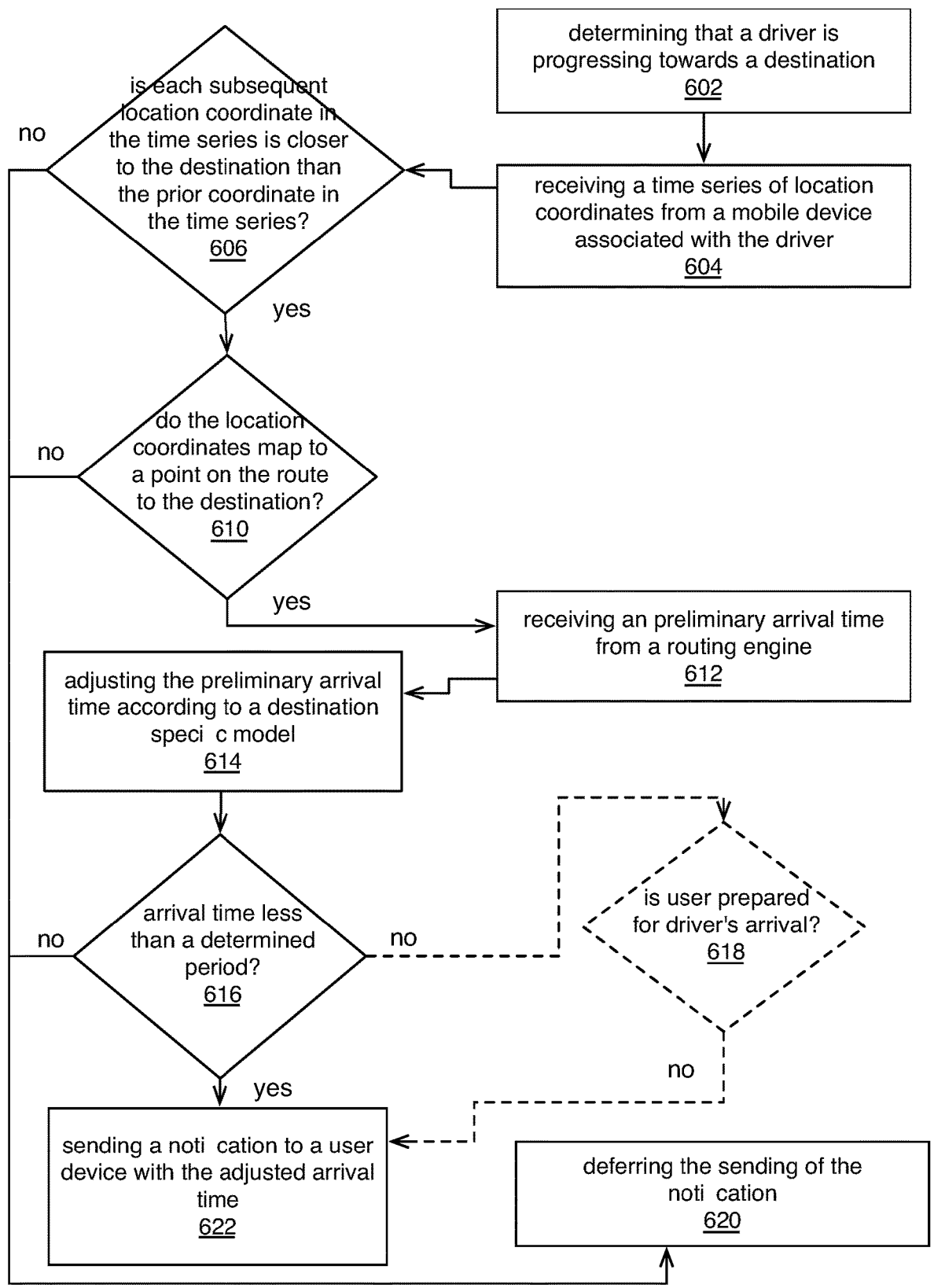
FIG. 7 shows an example method for determining when to send an arrival prediction in accordance with some embodiments.

FIG. 7 illustrates an example method of determining whether to provide a notification to a user regarding driver's 124 predicted arrival time. Arrival prediction service 115 can determine (602) that driver 124 is progressing towards the designated destination and can receive (604) a time series of location coordinates from location service 126 on driver device 125 indicating driver's 124 location and progress toward the designated destination.

Arrival prediction service 115 can determine (606) whether each subsequent location coordinates in the time series reported by location service 126 is closer to the destination than the prior coordinate in the time series. When arrival prediction service determines (606) that each subsequent location coordinate in the time series is closer to the destination than the prior coordinate in the time series, arrival prediction service can then determine (610) whether the location coordinates in the time series map to a point on a route to the designated destination. If either determination 606 or determination 610 fail, then arrival prediction service 115 can defer (620) the sending of a notification to customer device 104.

When the determination 606 and determination 610 are affirmed, and therefore driver 124 is progressing toward the designated destination, arrival prediction service 115 can receive (612) a preliminary arrival time from routing engine 120. Arrival prediction service 115 can adjust (614) the preliminary arrival time according to destination specific model 113.

In some embodiments, the method illustrated in FIG. 7 can include determinations of whether the driver is scheduled to make any additional stops, or can include a determination of whether the driver is located at, or within, a building (for a scheduled or unscheduled stop), and adjust (614) the preliminary arrival time accordingly.

Arrival prediction service 115 can then determine (616) if the arrival time is less than a predetermined period, and if so can send (622) a notification to customer device 104 with the adjusted arrival time. If arrival prediction service 115 determines (616) that the arrival time is longer than a predetermined period, arrival prediction service may determine whether (618) user 102 is prepared for drivers arrival to determine whether to relax the predetermined period.

User 102 can be considered prepared for driver's 124 arrival when customer device 104 notifies server 112 that user 102 is outside and waiting for driver's 124 arrival. However if user 102 is determined to be inside a building, perhaps by reporting existence of a Wi-Fi fingerprint or other indoor location marker, server 112 may determine user 102 is not prepared for drivers arrival and may expand the determined period to notify user 102 earlier than the default period.

Finally arrival prediction service 115 can send (622) a notification to customer device 104 with the adjusted arrival time.

In some embodiments, the decision of whether or not to provide a notification to a destination can also involve waiting for arrival predication service to achieve a sufficient confidence in the arrival prediction. Confidence can be built by receiving multiple predictions from the destination specific model over a period of time that generally correspond to each other.

While FIG. 7 does not illustrate a determination of whether the driver's location is within a building, persons of ordinary skill in the art will appreciate that such a determination can be made in association with the method illustrated in FIG. 7.

In addition to making determinations regarding whether and when to provide notifications to a destination or user at a destination, the present technology can also account for unreliable communication between customer device 104 and server 112. For example, if customer device 104 loses its Internet connection, server 112 may still be able to make a quality arrival prediction for user 102. In such embodiments, destination specific model 113 is aware of the most likely routes to destination 105 and the probabilities that user 102 will take each route. Therefore if server 112 becomes aware that user device 104 has initiated travel to destination 105, but then loses communications with user device 104, destination specific model 113 can still provide an arrival prediction notice to computing device 106 by projecting user 102 to be taking one of the most likely routes to destination 105.

In some embodiments server 112 can make arrival predictions by taking into account user's 102 mode of transportation. Server 112 can observe a current speed of travel and can make an assumption that user 102 is walking, biking, or driving. In some embodiments server 112 can learn user's 102 mode of transportation directly from user device 104. Server 112 can include user's 102 mode of transportation in requests to routing engine 122 to learn of an estimated arrival time. Arrival prediction service 115 can also take into account user's 102 mode of transportation.

In some embodiments, user device 104 can determine that it has arrived at destination 105 or server 112 can notify device 104 that it is close to destination 105. When user device 104 has arrived or is close to destination 105, user device 104 can automatically surface a user interface to receive feedback from customer 102 on whether or not their order was ready when they arrived, and this feedback can also be provided to server 112.

In some embodiments, the user interface that is surfaced by user device 104 can be a map of an area surrounding destination 105, and a user can designate where they are located surrounding destination 105 so that a clerk from the merchant located at destination 105 can bring user's 102 order directly to user 102.

In some embodiments, it may also be possible for user device 104 to detect beacons such as low-power Bluetooth beacons when they enter a parking lot for destination 105. In such embodiments user device 104 can report the detection of the Beacon to server 112 which can prompt server 112 to send an arrival notification to computing device 106.

Figure 8:
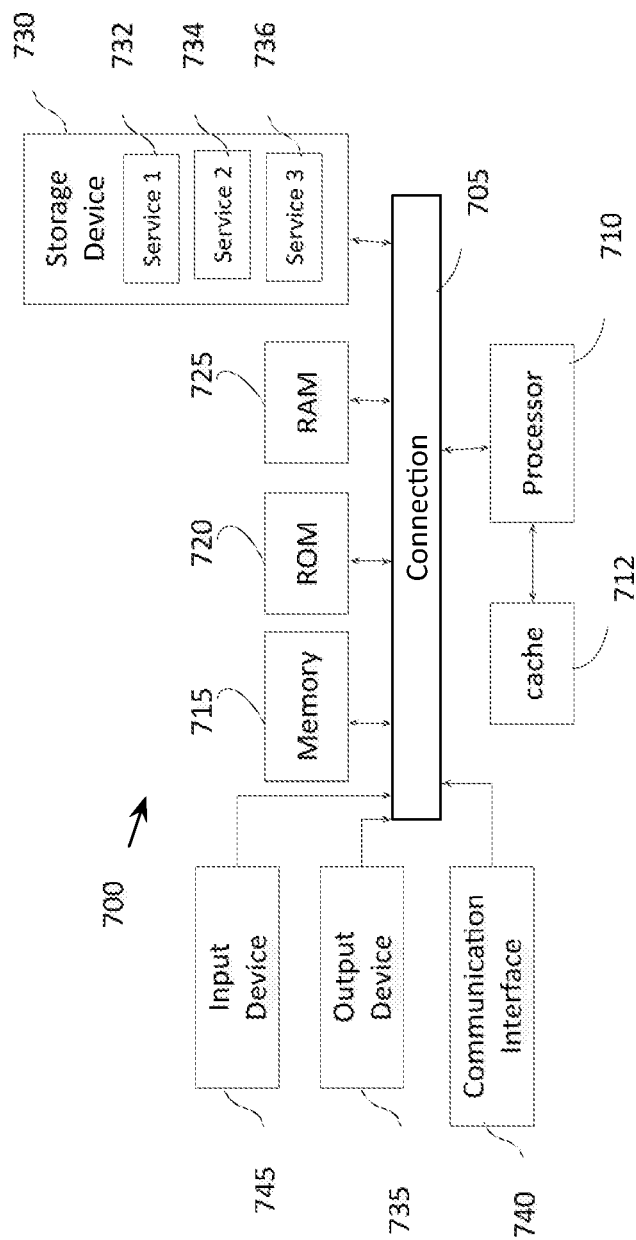
FIG. 8 shows an example of a system for implementing certain aspects of the present technology in accordance with some embodiments.

FIG. 8 shows an example of computing system 700 in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some embodiments computing system 700 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read only memory (ROM) and random access memory (RAM) to processor 710. Computing system 700 can include a cache of high-speed memory connected directly with, in close proximity to, or integrated as part of processor 710.

Processor 710 can include any general purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. There is no restriction on operating on any particular hardware arrangement and therefore the basic features here may easily be substituted for improved hardware or firmware arrangements as they are developed.

Storage device 730 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for providing accurate arrival time alerts, the method comprising:
   generating, using a machine learning technique, a destination specific model for a destination, wherein the destination specific model is generated based on historical data collected on a plurality of past trips by a plurality of users to the destination;
   receiving a preliminary arrival time of a user device at the destination;
   determining a level of accuracy of the preliminary arrival time based on a current direction of movement of the user device;
   upon determining that the level of accuracy of the preliminary arrival time warrants an update to the preliminary arrival time, updating the preliminary arrival time of the user device at the destination using the destination specific model to yield an updated arrival time; and
   upon arrival of the user device at the destination, updating the destination specific model based on accuracy of the updated arrival time, wherein the updated destination specific model is used for subsequent determination of preliminary arrival times for one or more additional users.

2. The computer-implemented method of claim 1, further comprising:
   notifying a computing device at the destination, of the updated arrival time.

3. The computer-implemented method of claim 1, further comprising:
   determining that the user device is progressing towards the destination by:

receiving a time series of location coordinates from the user device; and
determining that each subsequent location coordinate in the time series is closer to the destination than a prior coordinate in the time series.

4. The computer-implemented method of claim 1, further comprising:
determining that the user device is progressing towards the destination by determining that location coordinates of the user device map to a point on a route to the destination.

5. The computer-implemented method of claim 1, wherein the machine learning technique comprises:
analyzing data of notifications sent to a computing device at the destination, the data for each notification of the notifications includes at least: a rating of an accuracy of a respective notification, route data describing a route taken by a respective user to the destination associated with the respective notification, and a time of day associated with the respective notification.

6. The computer-implemented method of claim 1, wherein the destination specific model includes a plurality of dimensions including at least:
route taken to destination, most likely stops along the route, delays on a route, and delays at a time of day.

7. The computer-implemented method of claim 1, wherein updating the preliminary arrival time comprises:
deferring sending a notification to a computing device at the destination when an output of the destination specific model indicates a likely delayed arrival time for the user device relative to the preliminary arrival time.

8. A system comprising:
one or more memories having computer-readable instructions stored therein; and
one or more processors configured to execute the computer-readable instructions to:
generate, using a machine learning technique, a destination specific model for a destination, wherein the destination specific model is generated based on historical data collected on a plurality of past trips by a plurality of users to the destination;
receive a preliminary arrival time of a user device at the destination;
determine a level of accuracy of the preliminary arrival time based on a current direction of movement of the user device;
upon determining that the level of accuracy of the preliminary arrival time warrants an update to the preliminary arrival time, update the preliminary arrival time of the user device at the destination using the destination specific model to yield an updated arrival time; and
upon arrival of the user device at the destination, update the destination specific model based on accuracy of the updated arrival time, wherein the updated destination specific model is used for subsequent determination of preliminary arrival times for one or more additional users.

9. The system of claim 8, wherein the one or more processors are further configured to execute the computer-readable instructions to notify a computing device at the destination, of the updated arrival time.

10. The system of claim 8, wherein the one or more processors are further configured to execute the computer-readable instructions to determine that the user device is progressing towards the destination by:
receiving a time series of location coordinates from the user device; and
determining that each subsequent location coordinate in the time series is closer to the destination than a prior coordinate in the time series.

11. The system of claim 8, wherein the one or more processors are further configured to execute the computer-readable instructions to determine that the user device is progressing towards the destination by determining that location coordinates of the user device map to a point on a route to the destination.

12. The system of claim 8, wherein the machine learning technique comprises:
analyzing data of notifications sent to a computing device at the destination, the data for each notification of the notifications includes at least: a rating of an accuracy of a respective notification, route data describing a route taken by a respective user to the destination associated with the respective notification, and a time of day associated with the respective notification.

13. The system of claim 8, wherein the destination specific model includes a plurality of dimensions including at least:
route taken to destination, most likely stops along the route, delays on a route, and delays at a time of day.

14. The system of claim 8, wherein the one or more processors are further configured to execute the computer-readable instructions to update the preliminary arrival time by deferring sending a notification to a computing device at the destination when an output of the destination specific model indicates a likely delayed arrival time for the user device relative to the preliminary arrival time.

15. One or more non-transitory computer-readable media comprising computer-readable instructions, which when executed by one or more processors, cause the one or more processors to:
generate, using a machine learning technique, a destination specific model for a destination, wherein the destination specific model is generated based on historical data collected on a plurality of past trips by a plurality of users to the destination;
receive a preliminary arrival time of a user device at the destination;
determine a level of accuracy of the preliminary arrival time based on a current direction of movement of the user device;
upon determining that the level of accuracy of the preliminary arrival time warrants an update to the preliminary arrival time, update the preliminary arrival time of the user device at the destination using the destination specific model to yield an updated arrival time; and
upon arrival of the user device at the destination, update the destination specific model based on accuracy of the updated arrival time, wherein the updated destination specific model is used for subsequent determination of preliminary arrival times for one or more additional users.

16. The one or more non-transitory computer-readable media of claim 15, wherein execution of the computer-readable instructions by the one or more processors, further cause the one or more processors to notify a computing device at the destination, of the updated arrival time.

17. The one or more non-transitory computer-readable media of claim 15, wherein execution of the computer-readable instructions by the one or more processors, further cause the one or more processors to determine that the user device is progressing towards the destination by determining that location coordinates of the user device map to a point on a route to the destination.

18. The one or more non-transitory computer-readable media of claim 15, wherein the machine learning technique comprises:
analyzing data of notifications sent to a computing device at the destination, the data for each notification of the notifications includes at least: a rating of an accuracy of a respective notification, route data describing a route taken by a respective user to the destination associated with the respective notification, and a time of day associated with the respective notification.

19. The one or more non-transitory computer-readable media of claim 15, wherein the destination specific model includes a plurality of dimensions including at least:
route taken to destination, most likely stops along the route, delays on a route, and delays at a time of day.

20. The one or more non-transitory computer-readable media of claim 15, wherein execution of the computer-readable instructions by the one or more processors, further cause the one or more processors to update the preliminary arrival time by deferring sending a notification to a computing device at the destination when an output of the destination specific model indicates a likely delayed arrival time for the user device relative to the preliminary arrival time.

* * * * *